3,557,187
PRODUCTION OF 1,4-DICYANOBUTENE-(2)
Hans-Martin Weitz, Frankenthal, Pfalz, Franz Merger, Ludwigshafen (Rhine), and Juergen Koopmann, Neustadt, Germany, assignors to Badische Anilin- & Soda-Fabrik Aktiengesellschaft, Ludwigshafen (Rhine), Germany
Filed May 18, 1966, Ser. No. 551,145
Claims priority, application Germany, May 19, 1965, 1,518,553
Int. Cl. C07c 121/06
U.S. Cl. 260—465.8       5 Claims

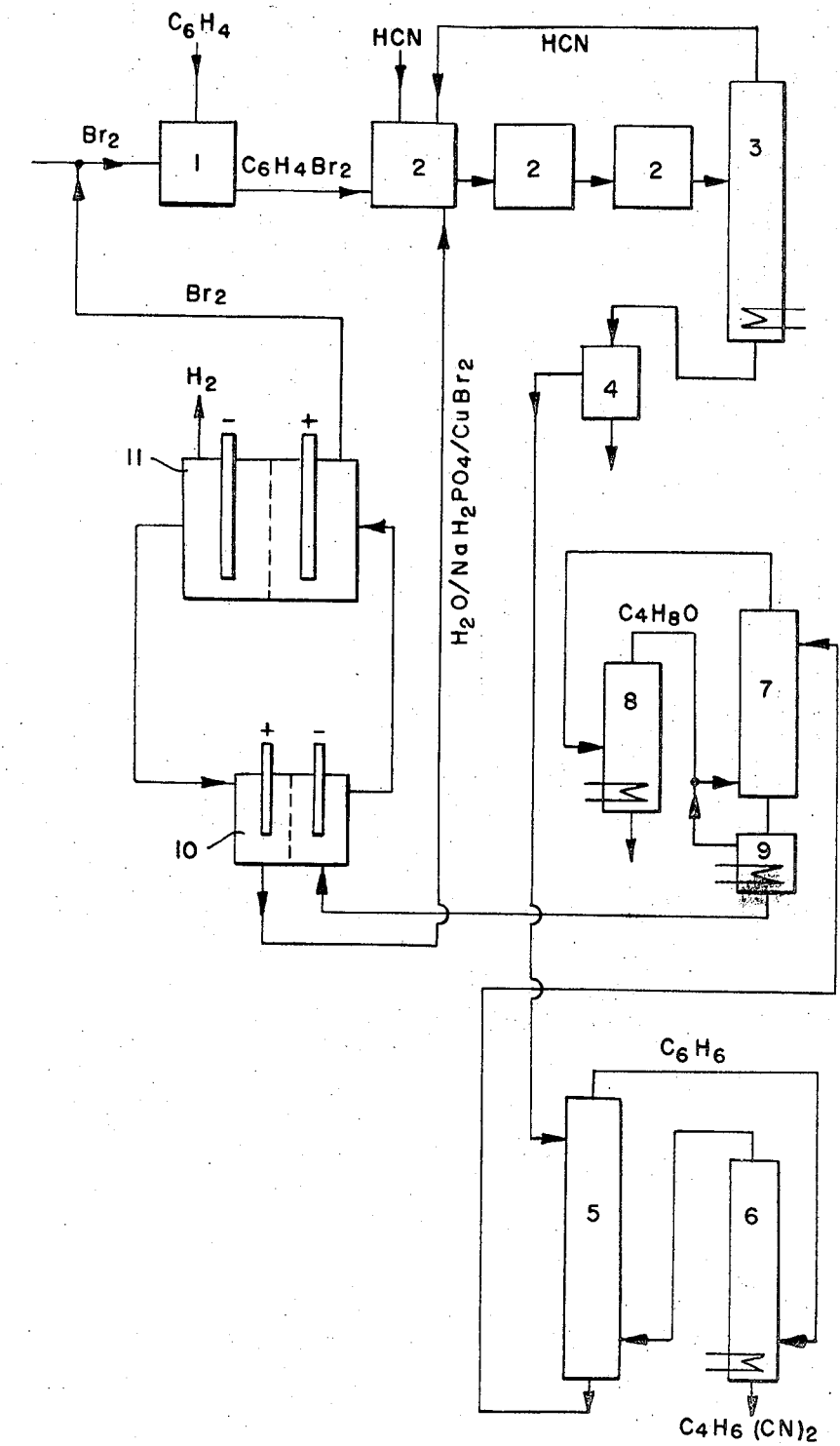

ABSTRACT OF THE DISCLOSURE

A process for producing 1,4-dicyanobutene-(2) in which at least one of the compounds 1,2-dibromobutene-(3) or 1,4-dibromobutene-(2) is reacted with hydrocyanic acid in the presence of a copper salt catalyst. The process takes place in the presence of an aqueous acid medium and in the presence of an acid acceptor. During the reaction a pH of from —1 to +3 is maintained. The hydrogen bromide that is present in the reaction solution is oxidized to elementary bromine and the aqueous solution containing the acid acceptor is recycled to the reaction mixture. The rate of reaction of the process is considerably higher than that of conventional methods and lower yields of by-products are achieved.

---

This invention relates to a process for the production of 1,4-dicyanobutene-(2) by reaction of 1,2-dibromobutene-(3), 1,4-dibromobutene-(2) or a mixture of the two with hydrocyanic acid in an aqueous medium.

One of the most important fiber intermediates is hexamethylene diamine which is easily obtainable for example by hydrogenation of cis-1,4-dicyanobutene-(2) and/or trans-1,4-dicyanobutene-(2). In the production of 1,4-dicyanobutene-(2) it is preferable to start from butadiene-(1,3) which is converted by chlorination into dichlorobutene which is then reacted with an alkali metal cyanide or with hydrocyanic acid in the presence of an acid acceptor and a copper salt as catalyst. The rate of reaction is not satisfactory and furthermore considerable amounts of by-products are formed. Not only butadiene and hydrocyanic acid, but also one mole of chlorine and two moles of alkali are required for the production of 1 mole of dicyanobutene, according to the empirical equation:

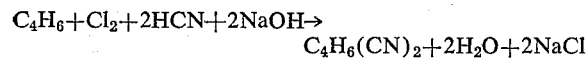

$$C_4H_6 + Cl_2 + 2HCN + 2NaOH \rightarrow C_4H_6(CN)_2 + 2H_2O + 2NaCl$$

Fairly large amounts of effluents are formed which contain the copper salt used as catalyst in a difficultly recoverable form as well as small amounts of hydrocyanic acid or cyanides. The disposal of these effluents presents great difficulties because they cannot be discharged without detoxification into rivers.

Although it has already been recommended that dibromobutenes be used instead of dichlorobutenes, such a method has never been seriously considered for economy reasons and reactions of this kind have as yet not been carried out in practice.

It is an object of the present invention to provide a process for the production of 1,4-dicyanobutene-(2) from dihalobutenes and hydrocyanic acid which proceeds at higher rates of reaction and yields only minimal amounts of by-products. It is another object of the invention to provide a process for the production of 1,4-dicyanobutene-(2) from dihalobutenes and hydrocyanic acid in which the halogen is recovered and in which no alkali is used up. Moreover, it is an object of the invention to provide a process for the production of 1,4-dicyanobutene-(2) which makes use of butadiene and hydrocyanic acid as starting materials and in which no other chemicals are used up. In particular the object of this invention is to provide a process for the production of 1,4-dicyanobutene-(2) in which large amounts of effluents are not formed.

These and other objects are achieved in a process for the production of 1,4-dicyanobutene-(2) according to which 1,2-dibromobutene-(3) and/or 1,4-dibromobutene-(2) is or are reacted with hydrocyanic acid in the presence of copper salts as catalyst in an aqueous acid medium in a pH range of from —1 to +3 using a buffer substance which exhibits buffering action in the said pH range as an acid acceptor, the resultant 1,4-dicyanobutene-(2) is separated from the reaction mixture, the hydrogen bromide present in the aqueous solution is oxidized to elementary bromine, the bromine is separated and the aqueous solution is returned to the reaction.

The new process has a number of advantages. The rate of reaction is considerably higher than in conventional methods starting from dichlorobutenes. Owing to the shorter residence times, secondary reactions which in conventional methods result in lower yields are diminished. The reaction may be carried out with very high yields. There are practically no problems with regard to the effluents because in each case the aqueous solution is returned to the reaction. With the recovery of the bromine (which may be reacted again with butadiene to form dibromobutene) and the acid acceptor, the synthesis of 1,4-dicyanobutene-(2) from butadiene and hydrocyanic acid can, in short, be carried out practically without the formation of by-products.

In carrying out a reaction it is obvious to work up the by-products obtained with the object of returning them to the reaction. In the prior art reaction of dichlorobutene for example with sodium cyanide, working up the sodium chloride obtained into chlorine and caustic soda solution is however impossible. Apart from the fact that the recovery of chlorine requires considerably more energy than the recovery of bromine, the aqueous solutions containing chloride are contaminated to such an extent that reuse leads to a considerable reduction in the quality of the product. Surprisingly this is not the case with the process according to this invention.

The compounds used as starting materials, namely 1,2-dibromobutene-(3) and 1,4-dibromobutene-(2) (the latter being present as the trans-isomer or as the cis-isomer), are obtained by a conventional method from butadiene and bromine. It is advantageous to use the bromine obtained by oxidation of the hydrogen bromide present in the aqueous phase for the reaction with butadiene. It is not necessary to separate the mixture of isomers thus obtained because both compounds are converted in the same way into 1,4-dicyanobutene-(2). It is also possible to use an industrial dibromobutene containing for example small amounts of tetrabromobutane.

Hydrocyanic acid of commercial purity is used. Dibromobutene and hydrocyanic acid are used in practically stoichiometric amounts. To ensure a rapid reaction and a quantitative conversion it is recommendable, however, to use an excess of hydrocyanic acid, for example 10 to 400% above the stoichiometric amount, and to recover this excess by conventional methods after the reaction is over.

Salts of monovalent or divalent copper are used as catalysts, the divalent salts being preferred. Although copper salts having any anion, i.e. both salts of inorganic acids and of organic acids, are suitable, it is preferred to use bromides, cyanides or salts of those acids on which the acid acceptors are based. The following may be given as examples copper(I) bromide, copper(II) bromide, copper(I) cyanide, copper(II) sulfate, copper(II) dihydrogen phosphate, copper(II) phthalate, copper(II) oxalate and copper(II) trichloroacetate. Copper(I) oxide, copper(II) oxide, copper(I) carbonate or copper(II) carbonate may however also be used. The catalyst need only be used in small amounts. In general the amount used is 1 to 50 millimoles, preferably 4 to 15 millimoles, of copper compound per liter of reaction solution.

The reaction is carried out in aqueous medium and in the pH range of from −1 to +3, particularly from −0.5 to +2. Water is in general used in an amount which is 0.5 to 20 times, preferably 1 to 6 times, that of the starting materials (dibromobutene and hydrocyanic acid).

Buffer substances which exhibit buffering action in the said pH range are used as acid acceptors. Examples of such buffer substances are the alkaline earth metal salts or preferably the alkali metal salts of medium strength acids, with or without an addition of the corresponding acid. Soluble buffer substances are preferred in order to ensure that the reaction proceeds uniformly. Although salts of organic acids, such as potassium hydrogen phthalate, sodium trichloroacetate and sodium hydrogen oxalate, are also suitable, it is preferred to use alkaline earth or alkali metal salts of difficultly volatile inorganic acids, suitable salts being those of the metals magnesium, calcium, strontium, barium, lithium and particularly of sodium and potassium which have a solubility of more than 50 g. per liter of water at 100° C. The inorganic acids should be difficultly volatile, i.e. they should have a vapor pressure at 100° C. which is advantageously less than 10 mm. Hg. The acid corresponding to the salt used, i.e. the compound in which one metal equivalent of the salt is to be replaced by a hydrogen atom, should advantageously have a pK value at 20° C. of from 0.85 to 4, particularly from 2 to 4. Examples of suitable salts are sodium sulfate, potassium sulfate, magnesium sulfate, alkali metal dihydrogen arsenates, alkali metal dihydrogen pyrophosphates, alkali metal metaphosphates and particularly alkali metal dihydrogen orthophosphates. Potassium fluoride and magnesium dihydrogen phosphate may aso be used as buffer substances. Mixtures of buffer substances may also be used. The amount of acid acceptor must be sufficient to prevent the pH value of the reaction solution from falling too much during the course of the reaction. For this purpose at least 1 equivalent, preferably more than 1.5 equivalents and particularly more than 2 equivalents of the acid acceptor are required per mole of dibromobutene to be reacted. A larger excess, for example about 5 to 10 equivalents per mole of dibromobutene, is not detrimental, but does not bring about any further advantage.

The solutions may also contain amounts of for example $10^{-5}$ to 1% by weight of substances such as are used for example as catalysts in the reoxidation of the bromine anions (described later), particularly nitric acid, nitrous acid, alkali metal nitrates, alkaline earth metal nitrates, alkali metal nitrites or alkaline earth metal nitrites. The solution moreover usually has a content of hydrogen bromide or alkaline earth metal salts or alkali metal salts thereof of about 1 to 15%, particularly from 2 to 10%, by weight due to the constituents which are returned.

The reaction is carried out at elevated temperature, in general at from 40° to 110° C., preferably from 60° to 90° C. Atmospheric pressure is generally used, but sometimes it is advisable to use super-atmospheric pressure, for example up to about 8 atmospheres gauge, in order to maintain a high concentration of hydrocyanic acid in the reaction mixture even at elevated temperature.

The reaction may be carried out continuously or batchwise. In batchwise operation the aqueous solution containing catalyst and acid acceptor is for example placed in a stirred vessel and dibromobutene and hydrocyanic acid are metered in at the reaction temperature at a rate commensurate with that of the reaction. Dibromobutene may also be placed in a reactor as a phase separate from the aqueous phase, or as a solution by adding organic water-soluble solubilizers, in which case hydrocyanic acid is merely metered in at a rate equivalent to that of the reaction. Heat of reaction may be carried away by external cooling or by evaporative cooling (evaporation of hydrocyanic acid and return of the condensate). When working continuously, the reaction vessel is for example charged continuously with all the starting materials. The reaction mixture obtained via an overflow is then allowed to complete its reaction in a residence zone before it is worked up. It is also advantageous to use a cascade of reactors or a flow tube while stirring or mixing intensely.

Separation of the 1,4-dicyanobutene-(2) from the reaction mixture is carried out in the usual way, for example by crystallization or by extraction with a solvent which has only slight solubility in water, for example an aromatic or chlorinated low aliphatic hydrocarbon, an ether, ester or a higher ketone. In this way the reaction solution is freed from practically all organic impurities. Isolation of the 1,4-dicyanobutene-(2) from the organic solution is for example carried out by distillation or crystallization.

In some cases it is advantageous to separate the bulk of the 1,4-dicyanobutene-(2) from the reaction mixture by crystallization so that an extremely pure product is obtained. The remainder can then be taken up in an organic solvent together with the organic impurities by liquid/liquid extraction and the remaining 1,4-dicyanobutene-(2) can be separated from this solution in a second crystallization, if necessary after partial evaporation. Since only a small amount of a less pure product is thus obtained, it is often convenient to dispense with this fraction which is then burnt in the subsequent oxidation of the solution.

It is often advantageous to free the aqueous solution from organic impurities prior to recovery of the bromine. This may be effected in conventional ways. Solvent residues may be removed for example by steaming. Some impurities which are soluble in water and can only be removed with difficulty by extraction may be converted by reaction with elementary bromine into compounds which can be extracted more easily.

Recovery of bromine from the aqueous solution is carried out by a conventional method, for example by electrolysis or by chemical oxidation, preferably with oxygen or air in the presence of a suitable catalyst. It may be advantageous not to oxidize the whole of the bromine present as anion into elementary bromine, but to return a portion of the bromine anions, for example 10 to 80%, particularly 15 to 40%, into the reaction.

Oxidation of the hydrogen bromide to bromine may be carried out in a particularly simple manner with oxygen or gases containing elementary oxygen. In general temperatures of from 200° to 350° C., advantageously from 220° to 300° C., are used. Oxidation is carried out under superatmospheric pressure, for example from 20 to 500 atmospheres gauge, and the partial pressure of oxygen is in general from 10 to 300 atmospheres gauge. The preferred pressure range is from 100 to 250 atmospheres gauge. It is advantageous for a small amount of an oxidation catalyst, preferably nitric acid, nitrous acid, alkali metal nitrates, alkali metal nitrites, alkaline earth nitrates or alkaline earth nitrites, to be present. Oxides of nitrogen which are converted under the oxidation conditions into nitric or nitrous acid may also be used. The catalyst need be used only in minimal amounts, for example about $10^{-5}$ to 1% by weight, with reference to the aqueous solution, Oxidation in general requires a reaction period of from 10 to 200 minutes. The optimum reaction period may easily be determined by preliminary experiment.

It is surprising that in the oxidation of the bromine anions to elementary bromine by means of oxygen the small amounts (about 0.1 to 5% by weight with reference to the aqueous solution) of organic substances which are present in the aqueous solution and are for example formed as by-products of the reaction are oxidized practically quantitatively at the same time into carbon dioxide and water, organic substances containing bromine also yielding elementary bromine.

Separation of the bromine may be effected by conventional methods, for example by phase separation at low temperature, by extraction with an inert solvent, by distillation or by injecting steam, nitrogen or another inert gas or by a combination of the said measures. After the elementary bromine has been separated, the aqueous solution containing the catalyst and acid acceptor is ready for another reaction, if necessary after making good any loss of water. After prolonged operation it is advantageous, if by-products of the reaction begin to accumulate, to discard a portion of the solution and replace it by fresh solution.

The recovered bromine is advantageously used for the reaction with butadiene to form dibromobutene.

The invention is illustrated by the following examples in which parts mentioned are by weight.

EXAMPLE 1

A mixture of 43 parts of dibromobutene (obtained by adding bromine to butadiene and consisting of about 70% of 1,4-dibromobutene-(2) and about 30% of 3,4-dibromobutene-(1)), 55 parts of sodium dihydrogen phosphate, 0.3 part of copper(II) bromide, 4 parts of hydrobromic acid (48%) and 200 parts of water is heated to about 30° C. in a stirred flask. The pH value is +1. While stirring intensely, 12 parts of hydrocyanic acid is allowed to flow in within about one minute and heating is slowly continued until the mixture reaches a temperature of about 70° C. after five minutes. At this temperature, the mixture is stirred for about another twenty minutes (pH value below zero). The remaining hydrocyanic acid is expelled by injecting nitrogen and the reaction mixture is then shaken three times, each time with 300 parts of benzene. After the benzene has been evaporated, 19 parts of dicyanobutene is obtained which has a melting point of 75° to 76° C.

An analogous result is obtained by using an equivalent amount of potassium dihydrogen orthophosphate instead of sodium dihydrogen orthophosphate. If sodium dihydrogen pyrophosphate be used instead of sodium dihydrogen orthophosphate, it is converted to a considerable extent into sodium dihydrogen orthophosphate under the reaction conditions.

EXAMPLE 2

This example is given with reference to the accompanying drawing which shows diagrammatically an embodiment of apparatus which is suitable for carrying out the process according to this invention.

The reactor consists of three stirred vessels 2 arranged in series to form a cascade, each vessel having heating means, an efficient stirrer and a reflux condenser, and each containing 160 parts of reaction mixture. 86 parts per hour of molten industrial dibromobutene (prepared by adding bromine to butadiene), 700 parts per hour of an aqueous solution which contains 25% by weight of sodium dihydrogen phosphate, about 6% by weight of hydrobromic acid, 0.1% by weight of nitric acid and 0.2% by weight of copper(II) bromide (pH value about 0.1 to 0.6) and 22 parts of fresh, and 40 parts of recovered, gaseous hydrocyanic acid are introduced into the first vessel 2. The first vessel is kept at 70° C., the second vessel 2 is kept at 80° C. and the third vessel 2 is kept at 90° C. The total residence time of the reaction mixture in the cascade of stirred vessels is about forty minutes. The excess of hydrocyanic acid (40 parts) is removed from the reaction mixture by heating the liquid in a continuously operated degassing column 3 and returned to the first vessel 2. From the reaction mixture discharged from the bottom of the column 3, a small amount of tetrabromobutene, which forms its own phase, is separated in a separator 4 and the 1,4-dicyanobutene-(2) formed is extracted at about 70° C. with 800 parts of benzene per hour in a continuous pulsed extraction column 5. The solvent is expelled from the benzene solution thus obtained at the top of a continuous distillation column 6. 37 parts per hour of practically pure 1,4-dicyanobutene-(2) are obtained at the bottom of the column 6.

The remaining dissolved benzene is expelled from the solution by injecting steam and the solution is passed continuously into a corrosion resistant autoclave (having a lining of tantalum) which is provided with an overflow. The residence time is thirty minutes, the temperature is 290° C. and 200 atmospheres gauge of air is present. After cooling and releasing the pressure the mixture leaving the vessel contains less than 0.003% by weight of organic substances, whereas the original content is about 0.6% by weight. 65 parts of bromine may be extracted with carbon tetrachloride. The remaining solution, after being made up with water to compensate for the slight loss of water which occurs during the process, has a content of sodium dihydrogen phosphate of 25% by weight, of hydrogen bromide of about 6% by weight, of nitric acid of 0.1% by weight and of copper(II) bromide of 0.2% by weight. This solution is returned direct to the reaction.

EXAMPLE 3

This example is given with reference to the drawing, 22 parts of butadiene-(1,3) and 65 parts of gaseous bromine are introduced per hour into a reaction chamber 1 of suitable design and provided with cooling means and 87 parts per hour of dibromobutene is withdrawn in liquid form. The dibromobutene is passed as described in Example 2 into the first vessel 2 and reacted to form 1,4-dicyanobutene-(2). The 1,4-dicyanobutene-(2) is extracted with benzene and the aqueous reaction solution is freed from organic impurities with 700 parts per hour of methyl isobutyl ketone in a continuous pulsed extraction column 7, the ketone being distilled off at the top of a continuous distillation column 8. By-products collect at the bottom of the column 8. Small amounts of dissolved ketone are distilled off in the vessel 9 from the reaction solution and the copper ions are deposited cathodically in a small copper electrolytic cell 10. The reaction solution is then passed into a continuous electrolytic cell 11 provided with a suitable diaphragm, the solution entering the anode chamber and leaving the cathode chamber. 65 parts per hour of hydrogen bromide is electrolytically decomposed therein at 90° to 100° C. with the recovery of hydrogen and bromine. The vapor of bromine and water leaving the anode chamber is condensed, the water is returned to the anode chamber and 64 parts per hour of bromine is withdrawn in liquid form. The bromine is continuously evaporated and supplied again to the reaction with butadiene described above. After separating all the reactants and dissolving anodically the same amount of copper in the copper electrolytic cell 10 as was deposited prior to the electrolysis, 700 parts per hour of aqueous solution which once again has the same composition as it had prior to the reaction of dibromobutene with hydrocyanic acid, is continuosuly returned to the first vessel 2 of the three-stage cascade of stirred vessels.

EXAMPLE 4

The procedure of Example 3 is followed, but after the 1,4-dicyanobutene-(2) has been extracted elementary bromine is added to the aqueous solution until the color of bromine appears (about 4 parts). After extraction with methyl isobutyl ketone and after steaming out the remaining solvent, the aqueous phase is practically free from organic impurities.

We claim:

1. A continuous process for the production of 1,4-dicyanobutene-(2) which comprises: reacting 1,2-dibromobutene-(3), 1,4-dibromobutene-(2) or mixtures thereof with hydrocyanic acid in a reaction zone at from 40° to 110° C. in the presence of copper ions as catalyst in an aqueous acidic medium having a pH of no higher than about 3 and in the presence of an alkali metal or alkaline earth metal salt of a difficultly volatile inorganic acid in which the acid corresponding to the salt has a pK value of from 0.85 to 4 at 20° C. as a buffer substance, separating the 1,4-dicyanobutene-(2) formed from the mixtures, removing hydrogen bromide present in the solution, and recycling the aqueous solution containing the said buffer substance to said reaction zone.

2. A continuous process for the production of 1,4-dicyanobutene-(2) which comprises: reacting 1,2-dibromobutene - (3), 1,4-dibromobutene-(2) or mixtures thereof with hydrocyanic acid in a reaction zone at from 40° to 110° C. in the presence of copper ions as catalyst in an aqueous acidic medium having a pH of no higher than about 3 and in the presence of alkali metal or alkaline earth metal salt of sulfuric acid, arsenic acid, phosphoric acid, pyrophosphoric acid, meta phosphoric acid, and hydrofluoric acid as a buffer substance, separating the 1,4-dicyanobutene-(2) formed from the mixture, removing hydrogen bromide present in the solution, and recycling the aqueous solution containing the said buffer substance to said reaction zone.

3. The process as claimed in claim 1 which comprises using 1 to 10 moles of the buffer substance per mole of said 1,2-dibromobutene-(3) and 1,4-dibromobutene-(2).

4. A process as claimed in claim 3 wherein the pK value of said acid is from 2 to 4 at 20° C.

5. A process as claimed in claim 3 wherein said alkali metal or alkaline earth metal is selected from the group consisting of magnesium, calcium, strontium, barium, lithium, sodium, and potassium.

References Cited

UNITED STATES PATENTS

| | | | |
|---|---|---|---|
| 2,448,755 | 9/1948 | Zellner | 260—465.8 |
| 2,477,597 | 8/1949 | Hager | 260—465.8 |
| 2,518,608 | 8/1950 | Farlow | 260—465.8 |

JOSEPH P. BRUST, Primary Examiner

U.S. Cl. X. R.

23—154, 216